US006298338B1

(12) United States Patent
Melton et al.

(10) Patent No.: US 6,298,338 B1
(45) Date of Patent: Oct. 2, 2001

(54) SYSTEM AND METHOD FOR COMPUTING AN OFFSET SEQUENCE FUNCTION IN A DATABASE SYSTEM

(75) Inventors: Mark E. Melton, Round Rock; Robert M. Wehrmeister; Peter N. Lohman, both of Austin, all of TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/277,052

(22) Filed: Mar. 26, 1999

(51) Int. Cl.[7] ............... G06F 17/30; G06F 7/00
(52) U.S. Cl. .......... 707/2; 707/3; 707/4; 707/5; 705/7
(58) Field of Search ............... 707/1–9, 100–104, 707/200–206, 500; 717/5–8, 1–4; 705/7–10, 35–38

(56) References Cited

U.S. PATENT DOCUMENTS

| 5,717,911 | * | 2/1998 | Madrid et al. ............ 707/2 |
| 5,822,749 | * | 10/1998 | Agarwal ................. 707/2 |
| 5,875,334 | * | 2/1999 | Chow et al. ............. 717/5 |
| 5,930,795 | * | 7/1999 | Chen et al. ............. 707/100 |

OTHER PUBLICATIONS

Red Brick Systems, Inc. "Red Brick Systems White Paper; Decision–Makers, Business Data and RISQL®" © Copyright 1996–1998, PN 660010 2/97.

* cited by examiner

Primary Examiner—Hosain T. Alam
Assistant Examiner—Alford W. Kindred
(74) Attorney, Agent, or Firm—Gary S. Williams; Pennie & Edmonds LLP

(57) ABSTRACT

A database query compiler and compilation method has special facilities for compiling a query that includes an Offset sequence function, Offset(argument, index). During execution of the query, while the cursor for a table is pointing to a current row, the Offset function is used to access information from a previously accessed row. The argument of the Offset sequence function is a specified function of information associated with the previously accessed row of the table. The previously accessed row has a position that is index rows before the current row referenced by the cursor for the table. During compilation, the argument of the Offset sequence function is parsed to determine a set of auxiliary fields for each row of the table. Each auxiliary field of a row contains information that may be accessed during execution of the Offset sequence function while the cursor for that table is pointing to a subsequent row. The Offset sequence function is converted into a compiled set of instructions, including instructions for storing and reading the auxiliary fields to and from a buffer that is separate from the table. The buffer is preferably stored in volatile, main memory. As a result, the Offset sequence function is executed, and information from a previous row is accessed, without having to change the cursor position for the table.

8 Claims, 4 Drawing Sheets

SYSTEM AND METHOD FOR COMPUTING AN OFFSET SEQUENCE FUNCTION IN A DATABASE SYSTEM

The present invention relates generally to a system and method for executing database queries on an ordered sequence of rows, and particularly to a system and method for efficiently handling sequence functions that require evaluation of values stored in multiple rows of a database table.

BACKGROUND OF THE INVENTION

Sequence functions are functions that operate on ordered sets of rows and that require knowledge of or access to past values. An example of a sequence function is the running maximum function, which returns the maximum value up to the current point in an ordered sequence. Sequence functions are similar to scalar functions in that a single output value is produced for each input value. Sequence functions are different from scalar functions in that the result of a sequence function may depend on some or all of the previous values processed and the processing order.

Standard SQL (structured query language) does not provide for the direct expression or efficient computation of sequence functions. Computing sequence functions is very distinct from grouping rows or joining rows from different tables to produce a result. In the case of grouping rows, the source rows are combined with an aggregate function into a set of result rows, where each source row participates in at most a single result row. This amounts to a partitioning of the input rows into groups and then applying an aggregate to reduce each group to a single result row. In the case of joining tables, data for a result row depends on data from multiple source tables. Each source row may appear zero or more times in the result, depending on the join.

Standard SQL requires the user to construct an N-way self-join in order to compute a sequence function depending on N different rows. For example, consider a table with one row per day that records the day number and the low and high temperatures for the day. The change in low temperatures from day to day could be computed using a join query like the following:

SELECT (T1.LOWTEMP-T2.LOWTEMP)
    FROM TEMP T1, TEMP T2
    WHERE T1.DAY=T2.DAY-1
    ORDER BY DAY;
or
    SELECT (T1.LOWTEMP-(SELECT T2.LOWTEMP
      FROM TEMP T2
    WHERE T1.DAY=T2.DAY-1))
    FROM TEMP T1 ORDER BY DAY;

This approach has several drawbacks. First, the number of joined tables increases with the number of rows referred to in the scalar expression, making the syntax neither manageable nor intuitive. Furthermore, there is an assumption that the value of DAY always increments by one in the sequence; that is, there is no generic notion of "previous." Moreover, the execution performance of such queries is likely to be very poor because of the multiple joins.

SUMMARY OF THE INVENTION

In summary, the present invention is a database query compiler and compilation method that has special facilities for compiling a query that includes an Offset sequence function, Offset(argument, index). During execution of the query, while the cursor for a table is pointing to a current row, the Offset function is used to access information from a previously accessed row. However, repositioning the cursor for the table to access that information would require a change in context and thus a relatively large demand on the resources of the system executing the query.

The argument of the Offset sequence function is a specified function of information associated with the previously accessed row of the table. The previously accessed row has a position that is index rows before the current row referenced by the cursor for the table.

The Offset sequence function in the database query is compiled by parsing the argument of the Offset sequence function to determine a set of auxiliary fields for each row of the table. Each auxiliary field of a row contains information that may be accessed during execution of the Offset sequence function while the cursor for that table is pointing to a subsequent row.

During compilation, the Offset sequence function is converted into a compiled set of instructions, including instructions for storing and reading the auxiliary fields to and from a buffer that is separate from the table. The buffer is preferably stored in volatile, main memory. As a result, when the Offset sequence function is executed, information from a previous row is accessed without having to change the cursor position for the table.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Computer System

Figure 1:
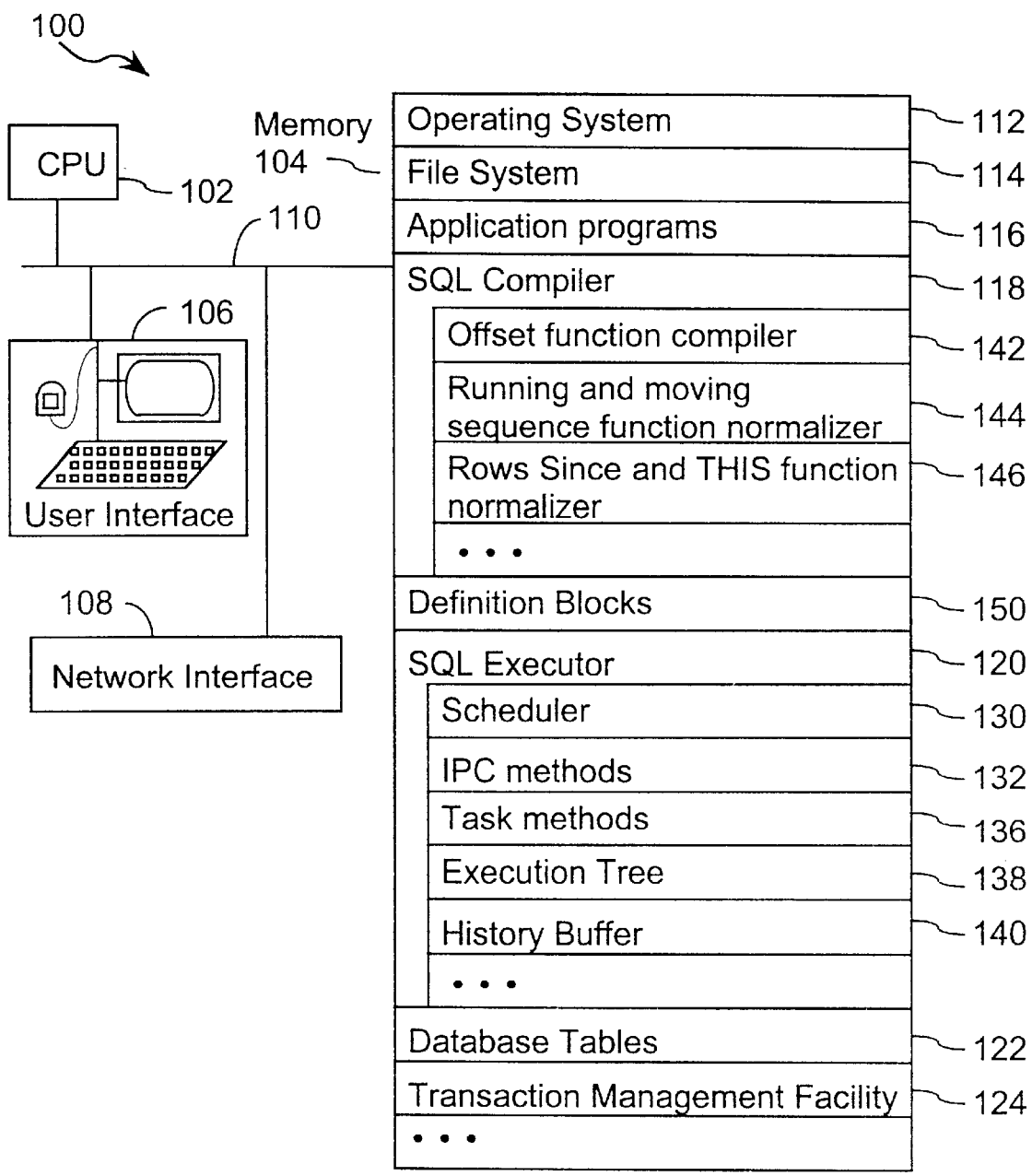
FIG. 1 is a block diagram of a computer system in which an embodiment of the present invention is implemented.

Before describing the operation of the invention, a computer system 100 in which an embodiment of the invention is implemented will be described with reference to FIG. 1. The computer system 100 includes:

- one or more data processing units (CPU's) 102,
- memory 104, which will typically include both high speed random access memory as well as non-volatile memory;
- a user interface 106; a
- network or other communication interface 108 for communicating with other computers; and
- one or more communication busses 110 for interconnecting the CPU(s) 102, memory 104, user interface 106 and network interface 108.

The number of CPU's can be greater, for instance, in a symmetric multiprocessor system.

The computer system's memory 104 stores procedures and data, typically including:

an operating system 112 for providing basic system services;

a file system 114, which may be part of the operating system;

application programs 116, such as programs executed in user address spaces on behalf of users of the system 100;

an SQL compiler 118, for compiling SQL statements (or more generally, database queries), and portions of SQL statements;

an SQL executor 120 for executing SQL statements;

database tables 122, for storing data; and a transaction management facility 124 that manages the execution of transactions.

The SQL executor 120, hereinafter called the executor, includes:

a scheduler 130 for scheduling the execution of tasks in an execution tree 138 (also called a task tree); the scheduler determines the order and frequency with which the tasks are executed;

a set of interprocess communication methods 132 for handling the communication of requests and replies between tasks that are in different processes (i.e., in different address spaces); the interprocess communication methods may be implemented as part of the operating system 112;

a set of task methods 136, which are the basic functions or procedures that can be performed by each of the tasks in an execution task tree; the present invention adds new tasks to this set of tasks;

an execution tree 138, which may include a number of subtrees that are located in separate processes; and a history buffer 140.

The history buffer 140 is a buffer that is used to store "auxiliary" columns of tables, which are columns of values that are computed and temporarily stored during the execution of a query. The use of the history buffer during query execution will be discussed in more detail below. The size of history buffer 140 is determined by the SQL compiler, or by the user, and operates as a circular buffer. Thus, once the history buffer is filled, the auxiliary value(s) for the oldest historical row stored in the history buffer are replaced by auxiliary values for the most recent historical row.

SQL Compiler, SQL Executor, Execution Trees

The SQL compiler 118 includes several features or sets of instructions that implement various aspects of the present invention, including:

an Offset function compiler 142, for compiling Offset sequence functions;

a running and moving sequence function normalizer 144, which converts running and moving sequence functions into one or more Offset sequence functions that are used in conjunction with a set of auxiliary fields; and a Rows Since and THIS function normalizer 146, for converting a Rows Since sequence function into a normalized form that facilitates efficient computation of the Rows Since sequence function.

Figure 2:
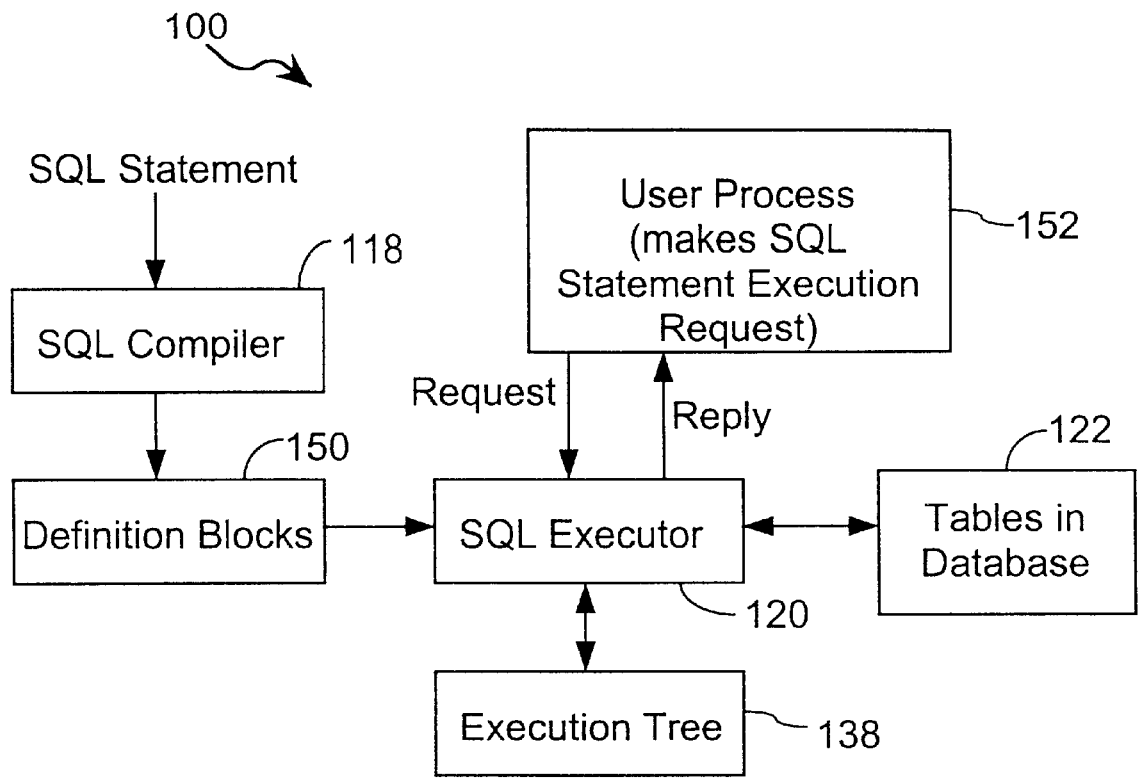
FIG. 2 depicts the relationship between an SQL compiler and an SQL executor.

Referring to FIG. 2, the SQL compiler 118 produces for the SQL executor 120 a set of definition blocks 150 from which the SQL executor 120 can build an execution tree 138. These definition blocks 150 are loaded by the SQL executor 120 and used to create control blocks (170, FIG. 3) arranged into a graph called an execution tree 138. The execution of SQL statements is thereafter accomplished by interpreting these control blocks. In a preferred embodiment, the SQL compiler 118 does not produce any binary machine instruction code; instead it produces definition blocks 150 that the SQL executor 120 interprets.

The execution tree 138 contains all the steps necessary for executing an SQL statement, including integrity checks, firing triggers, and the body of an invoked SQL stored procedure.

Figure 3:
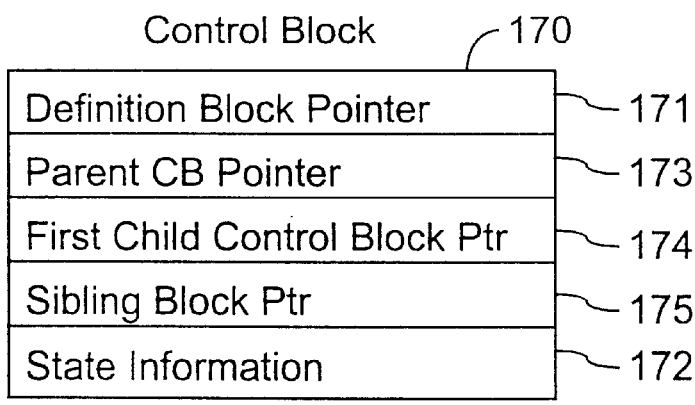
FIG. 3 depicts a control block data structure.
Figure 4:
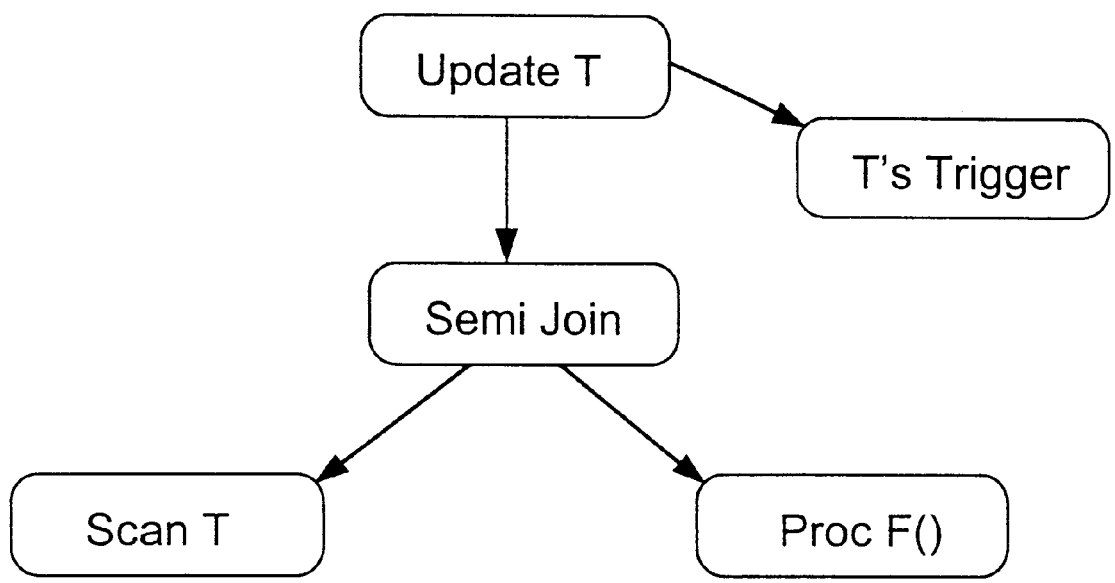
FIG. 4 depicts a control block task execution tree.

Referring to FIG. 3, each control block 170 generated by the SQL executor includes a pointer 171 to a definition block 150, state information 172 about the computational state of the associated task, and a set of parent 173, child 174 and sibling 175 control block pointers, which are used to form the directed graph or tree structure, an example of which is shown in FIG. 4.

Offset Sequence Function

An elegant and computationally more efficient way to provide this capability is with a scalar function that references data from previously computed rows. Let's define this function as OFFSET(EXPRESSION, INDEX). The Offset sequence function computes the value of the expression based on the data found in the row that is INDEX rows back. This represents the most basic sequence function and provides an essential primitive for expressing other sequence functions, some of which are discussed below. Using the Offset function, the "change in low temperatures" query discussed in the Background of the Invention section of this document can be rewritten as:

SELECT LOWTEMP−OFFSET(LOWTEMP, 1)
FROM TEMP
SEQUENCE BY DAY;

The SEQUENCE BY clause is needed to define the row sequence to use when applying the offset function. The relative position of rows in the sequence is always computed uniformly, irrespective of the sequencing column(s).

Simple Offset Model

Consider a simple model of a relational database system that is based on the data flow paradigm. In this system, a tree of data flow operators such as join, union, grouping, and so on is used to represent a query. Each operator may have one or more children but exactly one parent. Operators take as input rows from each child and combine them in some way to produce rows for the parent. Exceptions to these rules are the root node that does not have a parent and the leaf nodes that receive data directly from the operating system. Logically, an operator or sub-tree of operators in this model takes as input one or more source tables (a table being a set of rows with a given structure) and produce a single result table.

Next, consider a simple model for a sorted table. A sorted table is an ordered sequence of records. In this model a record in a sorted table can be uniquely identified by a record number. Also, we will assume that the record numbers are ascending integers. As mentioned above, the result of the Offset function is the value of the offset expression in terms of the data in the relative row indicated by the Offset index. The following steps describe a simple way to compute the Offset function:

Table 1

Simplified Procedure for Computing Offset Function

1. Evaluate the INDEX argument of the Offset function.
2. Cursor back the number of rows computed in step 1.

3. Evaluate the EXPRESSION argument of the Offset Function.
4. Cursor forward the number of rows computed in step 1.
5. Return the result of step 3 as the result of the Offset Function.

Next, we will consider an example, with reference to the table shown in Table 2.

TABLE 2

| Row Number | A | B | C | Offset(Offset(A,B),C) |
|---|---|---|---|---|
| 1 | 23 | 0 | 0 | 23 |
| 2 | 17 | 1 | 1 | 23 |
| 3 | 31 | 2 | 1 | 23 |
| 4 | 19 | 1 | 0 | 17 |
| 5 | 11 | 2 | 1 | 31 |

More specifically, we will consider how the expression Offset(Offset(A,B),C) is computed for row 3 of the table shown in Table 2, using the procedure shown in Table 1.

Execution of step 1 evaluates C in the third row for use as the index of the outer offset. Since C equals 1 in this row, the outer offset refers to the previous row (i.e., row 2). Step 2 repositions to row number 2. Step 3 evaluates the expression "Offset(A,B)" of the outer Offset function.

Executing step 1 of the inner Offset function on row number 2, returns the value of B for the index of the inner Offset function. B is equal to 1 for row number 2, and thus step 1 returns a value of 1. Based on the result of step 1, which returned a value of 1, step 2 cursors back one row to row number 1. Step 3 evaluates the expression of the inner Offset function, which is "A," for row number 1, which is equal to 23 (see column A of row number 1 in Table 2). Step 4 cursors back to row number 2 and step 5 returns the value, 23, computed in step 3.

Returning to the outer Offset function, step 3 for the outer Offset function results in a value of 23, because that is the value returned by the inner Offset function. Step 4 cursors back to row number 2 and step 5 returns the value, 23, computed in step 3.

Inefficiencies of Simple Model

There are two key considerations for the Offset function that are not addressed by the simple model: correct behavior and efficient performance.

With respect to the "correct behavior" requirement, in order to properly support SQL semantics, each argument of any Offset function must be computed exactly once with respect to a given row. After being computed, the arguments can be referenced any number of times. Using the simple model from the previous example, A is only evaluated for rows 1, 2 and 3. In general, A may be a complex expression that calls stored procedures or other routines. In order for these routines to have predictable side-effects (e.g., estimated resource usage, which may be taken into account when the SQL compiler determines a best execution plan for a query), A must be computed exactly once for each row.

In order to maximize performance, Offset requests must be satisfied (1) with the minimum number of repositions to other rows (cursor movements), and (2) with the minimum amount of data that must be stored from previous rows. The simple model above requires one reposition operation per Offset computation, or a total of two to evaluate the entire expression. In addition, the simple model requires storing all the columns that may be needed in order to compute the expression or index of an Offset function. Since the expressions and indexes are arbitrary scalar expressions, this is a potentially wide row.

The present invention provides a method for computing the Offset function, within the context of a data flow operator of a database system, that provides both correct behavior and efficient performance. It accomplishes this by ensuring that (1) each expression is evaluated only once, (2) a minimum of data is stored for previously computed rows, and (3) repositioning to other rows is minimized.

Scalar expressions are evaluated at query execution time by an expression engine that runs as part of the database system. The expression engine (i.e., which is a part of the SQL executor 120) evaluates a static, linear stream of instructions that have been generated by the SQL compiler of the database system. Consider the following SQL expression:

OFFSET(OFFSET(A+B, C), D+E).

Figure 5:
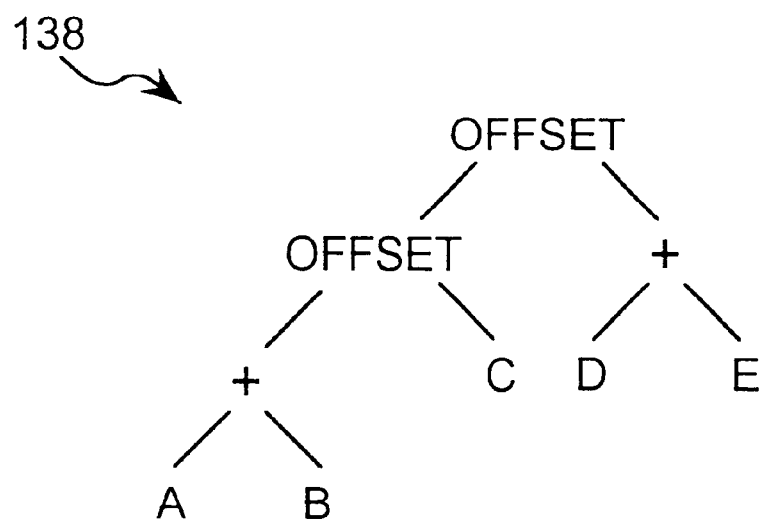
FIG. 5 depicts a scalar expression tree.

In the SQL compiler this expression is represented by the scalar expression tree shown in FIG. 5. Using the intuitive implementation of the Offset function discussed above, the standard traversal of the expression tree is insufficient to produce a static set of instructions for the expression engine. This is because the Offset nodes do not know the argument of their repositioning operation until they are executed. This requires a self-modifying capability for the code generation, which is atypical for an execution engine. Normally, scalar functions can be evaluated by first generating the code for the arguments and then applying the function. For example, for the addition function, the function is evaluated by first computing the first and second operands, and then adding the two operands. Nevertheless, the SQL compiler could be extended to generate the following code for the runtime expression evaluation engine (for evaluating the SQL expression noted above and shown in FIG. 5):

Table 3

Example of Non-Static, Inefficient Code for
Evaluating: OFFSET(OFFSET(A+B, C), D+E)

LD D;
LD E;
ADD;
PUSH $REPOS1 REPOSSTK;
REPOSITION;
LD C;
PUSH $REPOS2 REPOSSTK;
REPOSITION;
LD A;
LD B;
ADD;
UNREPOSITION;
UNREPOSITION;
ST $RESULT;

It should be noted that the code shown in Table 3 would be executed for each row to which the cursor is moved, and thus might be applied to all the rows of the table within a specified range, and in an order indicated by the SQL statement being compiled. When a reposition operation would move the cursor past the beginning of the table, null values are read from the non-existent rows, and a "ReplaceNull" function is used to automatically replace null values with an appropriate substitute value. Thus, each load (LD) operation in the compiled code is actually followed by a procedure call to a "ReplaceNull function, ReplaceNull(a, b,c), where the loaded value "a" is replaced by expression "c" if the value read is null and is otherwise replaced with expression "b". The expressions "b" and "c" are set by the compiler based on the context of the preceding load operation. In many such contexts, expression "b" will be set equal to the value read, "a". Expression "c" may be set to zero in some contexts, but will be set to other expressions in many other contexts. Some examples of procedures using the ReplaceNull function are used in later portions of this document.

As noted earlier, this code (Table 3) has two reposition operations and two inverse reposition operations. Each reposition operation requires a complete change of context to any arbitrary row. Also, the repositioning operations require storing the repositioning values in some globally accessible location (e.g., some sort of array or stack) that can be unwound for nested offset calls. These are potentially costly requirements. Furthermore, A, B and C must all be stored (in main memory) for each row processed in case a future row accesses these values.

Another problem with repositioning is the potentially expanded set of history rows needed to perform it. For example, the SQL select statement:

SELECT OFFSET(OFFSET(X, 1000), 1000) FROM T SEQUENCE BY A;

requires a 2000 row history if performed ad-hoc. However, as will be shown next, a 1000 row history can be used to execute this select statement using a non-intuitive method.

Efficient Offset Function Model

In particular, the instructions generated by the SQL compiler for the Offset function cause the expression engine to execute the following steps:

Table 4

Improved Procedure for Computing Offset Function

1. Compute the entire expression argument of the Offset function relative to the values in the current row. This is the same as computing the arguments to any scalar function, which simplifies the implementation of the Offset function.
2. Store the result of step 1 in an auxiliary column of the current row (actually, in the history buffer).
3. Compute the index argument of the offset function relative to the values in the current row. Again, this is the same as computing the arguments to any scalar function, which simplifies the implementation of the Offset function.
4. Retrieve the data in the auxiliary column for the number of rows (as computed in step 3) previous to the current row. If the index argument evaluated to zero, then this fetches the data from the current row.
5. Return the result of step 4 as the result of the Offset function.

Instead of the Offset function causing the expression engine to change contexts (i.e., cursor position), the Offset function simply computes the expression argument for the current row and stores that result in an auxiliary column and then fetches information from that same auxiliary column for another row identified by the computed index value. Since the auxiliary columns are stored in the history buffer 140 (FIGS. 1 and 6), these values can be retrieved without changing the row context.

Efficient evaluation of the Offset function requires that the cursor for the table remain positioned at the current row. All information from the row positioned index rows before the current row that is needed for evaluation of the Offset function is read from auxiliary columns in the history buffer, thereby avoiding the need for changing the cursor position. In addition, subject to the constraint that the Offset function be evaluated with changing cursor position, the number of auxiliary columns used is minimized.

Figure 6:
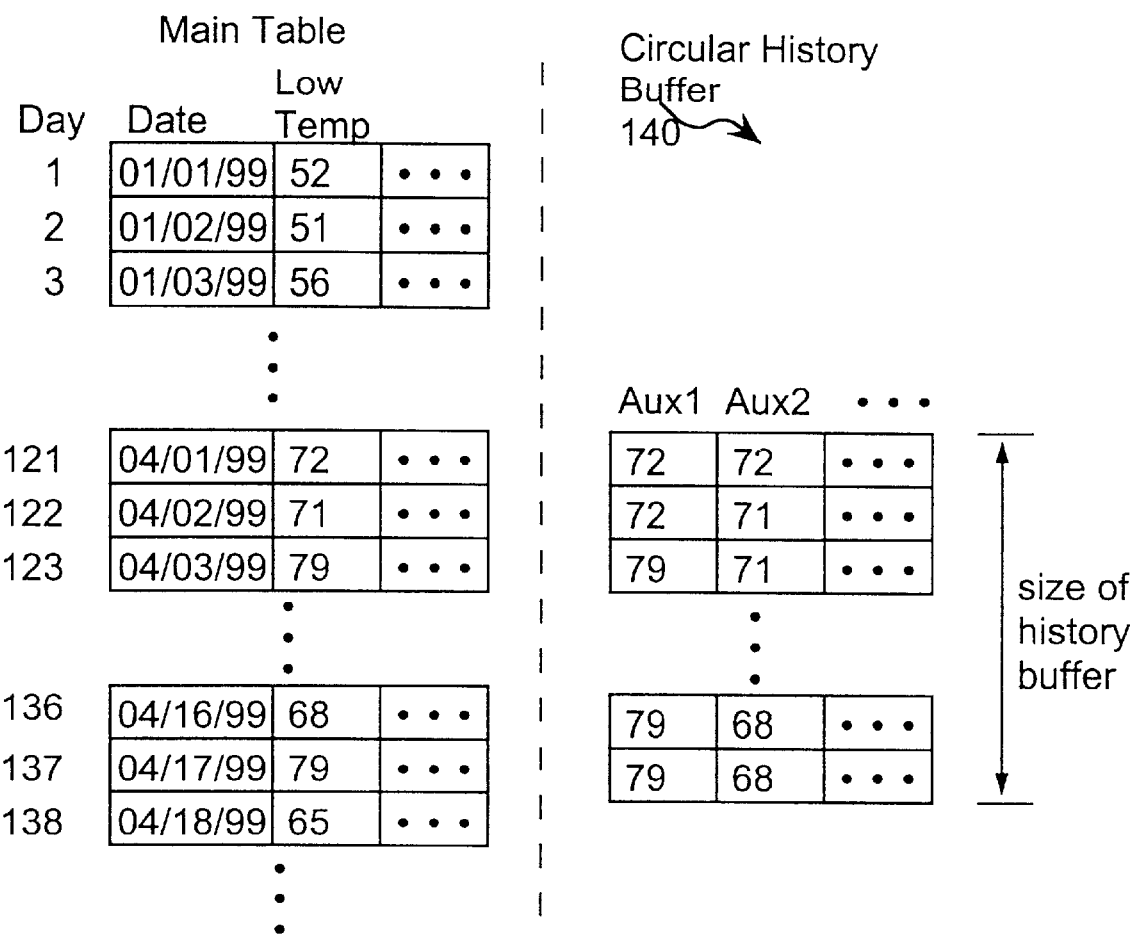
FIG. 6 depicts an exemplary implementation of a circular history buffer.

Referring to FIG. 6, values which will be needed by the Offset function while processing future rows, are "materialized" by storing them in auxiliary columns in the history buffer 140. While these auxiliary columns are shown in FIG. 6, as having generic "auxiliary" names, in each compiled query the columns in the table will have labels (if needed) and data formats assigned by the query compiler. While auxiliary columns may be used to replicate values stored in the corresponding rows, in order to make such values accessible while processing subsequent rows, more typically auxiliary rows are used to store values that result from processing more than one row of data. For example, an auxiliary column can be used to store the running total (or the running minimum or running maximum) of a field in a column of the table.

The history buffer 140 is preferably implemented as circular buffer stored in main memory, and thus must be more limited in size than some of the tables. Generally, the number of rows stored in the history buffer is determined by the SQL compiler based on a user specifiable parameter, which in turn should be determined by the largest anticipated Offset index. While the size of the history buffer is ostensibly limited by available memory, in actual use the history buffer size is unlikely to be limited by available memory. Once all the rows in the history buffer are filled with data (e.g., computed values), the first row is replaced by data for a next row, and so on, in typical circular buffer fashion.

An index for the Offset function can be out of range either (a) because an insufficient number of rows have been fetched so far, or (b) because the history buffer holds an insufficient number of rows. The run-time effects are indistinguishable from each other.

An SQL compiler in accordance with the present invention implements the improved procedure for evaluating Offset functions by parsing the expression of each Offset function to determine what value to store in auxiliary columns of the historical rows, with the auxiliary columns being stored in the history buffer. By storing the Offset expression values in the auxiliary columns, the values from historical columns needed to evaluate the Offset function are fetched from this history buffer instead of by repositioning the cursor.

An SQL compiler that implements the improved procedure for evaluating Offset functions would generate the following code for the example expression (where RLD is the "remote-load instruction," which fetches a column in the history buffer from a previous row):

TABLE 5

Example of Efficient Code for
Evaluating: OFFSET(OFFSET(A + B, C), D + E)

| | |
|---|---|
| LD A; | |
| LD B; | |
| ADD; | /* A + B */ |
| ST $TEMP1; | /* store A + B in aux col. 1 */ |
| LD C; | |
| RLD $TEMP1; | /* retrieve A + B from aux col. 1 of the history buffer for the row that is C rows back from the current row */ |

TABLE 5-continued

Example of Efficient Code for
Evaluating: OFFSET(OFFSET(A + B, C), D + E)

```
ST $TEMP2     /* store the A + B value from C rows back in aux
              col. 2*/
LD D;
LD E;
ADD;          /* D + E */
RLD $TEMP2    /* Retrieve A + B value from aux. col 2 for the row
              that is D + E rows back from the current row. Note
              that this is the A + B value from aux. col 1 from
              C + D + E rows back from the current row.*/
ST $RESULT;
```

It is noted that the code shown in Table 5 would be executed for each row to which the cursor is moved, and thus might be applied to all the rows of the table within a specified range, and in an order indicated by the SQL statement being compiled. Also, as discussed above with reference to Table 5, calls to a ReplaceNull function will be inserted by the compiler wherever null values might be read. For instance, each of the RLD instructions would be followed by a ReplaceNull function call, or alternately the ReplaceNull function might be embedded in the code for implementing the RLD instruction. In each instance, the ReplaceNull function call might be of the form "ReplaceNull(a,a,0), where the value retrieved from the history buffer is left unchanged if it is not null, and is replaced by zero if it is null.

The code in Table 5, above, for executing the Offset function has the following important characteristics:

The cursor position remains at the current row while the Offset function is evaluated.

Each expression in the Offset function is evaluated exactly once per row. This ensures that side effects of the compiled procedure for evaluating the Offset function are predictable.

There is only one fetch of data, per Offset, not in the current row. The remote fetches are much less expensive, in terms of computational resources, than changing the environment of the expression engine (i.e., changing the cursor position) to do general computations on an arbitrary row.

All information needed by the Offset function from the previous row is read from auxiliary columns (i.e., in the history buffer).

The compiler minimizes the number of auxiliary columns used, so as to conserve memory and computational resources. In the example shown in Table 5, the compiler determines that the single quantity A+B can be stored in a single auxiliary column, instead of using three auxiliary columns to store the separate values A, B and C. In other words, the cost of each nested offset expression becomes simply the creation of one necessary auxiliary column for each row, while the savings consists of one cursor position-reposition operation pair and the elimination of unnecessary sub-expressions stored as auxiliary columns.

As will be described in more detail below, the Offset function is the basic building block for most other sequence functions. Therefore the efficient expression and computation of the Offset function is the basis for an efficient implementation of sequence functions in a database engine.

Running and Moving Sequence Functions

In addition to the Offset function, several running and moving sequence functions are useful. Examples of such functions are:

RunningMin(a)—determines the minimum value of an expression "a" for all rows in a defined range of rows;

RunningMax(a)—determines the maximum value of an expression "a" for all rows in a defined range of rows;

RunningAverage(a)—determines the average value of an expression "a" for all rows in a defined range of rows;

RunningSum(a)—determines the sum of the value of an expression "a" for all rows in a defined range of rows;

RunningVariance(a)—determines the variance of the value of an expression "a" for all rows in a defined range of rows;

MovingAverage(a, window)—determines the average value of an expression "a" for the rows in a moving window having a specified number (window) of contiguous rows;

MovingSum(a, window)—determines the sum of the value of an expression "a" for the rows in a moving window having a specified number (window) of contiguous rows; and MovingVariance(a, window)—determines the variance of the value of an expression "a" for all rows in a moving window having a specified number (window) of contiguous rows.

In general, running functions pertain to all rows in a sequence of rows, up to the current row, while moving functions pertain to a moving window consisting of the current row and an specified (arbitrary) number of previous rows.

The straightforward approach is to view any running function $R(x)$ as a special version of the moving function $M(x,w)$, where w is the number of rows processed so far. Seen this way, computing both the running and moving sequence functions requires accessing all of the rows within the window (which is potentially all the rows) each time the function is computed.

As an example, consider computing the moving average for attribute "a" over the past m rows, or MovingAverage (a,m). This requires computing the sum of "a" over the last m rows and dividing by the count m. Since m is a general expression whose value is only known when computing the result for the current row, it is impossible to have already computed the required sum in a running fashion. Using such an approach, computing the result of a moving function for a given row requires accessing each of an arbitrary number of previously computed rows.

The present invention greatly reduces the computational resources required to compute the running and moving sequence functions by providing a method for normalizing such functions during SQL compilation. The normalization allows the functions to be computed in a small number of operations per function, independent of both the number of rows previously processed and the moving window size. The resulting expressions consist only of the primitive Offset function and other standard scalar expressions.

The following normalization operations for the running and moving sequence function are performed during SQL compilation. These operations rely on the following facts:

1) a given running function $R(x)$ can always be computed strictly in terms of values in the previous row and values in the current row; and 2) a given moving function $M(x, w)$ can always be computed as the difference between the current value of the equivalent running function, or $R(x)$ and the same function's value at the offset representing the first row of the moving window, or $Offset(R(x), w)$.

An important and unexpected property of the normalization procedure of the present invention is that by employing at most two Offset expressions, any of the moving functions shown in Table 6 (i.e., not including minimum and maximum value moving functions) can be expressed in terms of Offsets of a corresponding running function. Thus, if the normalization procedure converts a particular running function into a sequence of expressions that includes N Offset expressions, the corresponding moving function, when normalized, will include at most N+2 Offset expressions.

Table 6 shows the transformations for each of the running and moving sequence functions listed above. In Table 6, the ReplaceNull(a,b,c) function is the same as defined above. Thus, Replace(a,a,0) replaces "a" with zero when "a" is null because it is being read from a nonexistent row. ReplaceNull (a,1,0) replaces "a" with zero when a is null, and otherwise replaces it with the value 1. This latter version of the ReplaceNull function is useful for counting the number of rows processed in a running sequence function.

All the Running and Moving functions are defined in a reiterative or recursive manner, based on values stored in previous rows. Thus, it is assumed that the running or moving function will be executed against all the rows in a sequence, in order.

The ReplaceNull function may be implemented by the SQL compiler as specifying values to preload into the history buffer for one or more non-existent rows before the beginning of a table. In this implementation, the compiled code stores the replacement values for the auxiliary columns for one row when the compiled function is a running function, and stores replacement values (for the auxiliary columns) for window-1 rows when the compiled function is a moving function. For subsequent rows, the ReplaceNull function is compiled using the expression for the non-null case.

Alternately, the SQL compiler may compile each ReplaceNull function as a branch of code that is executed whenever an Offset function references values for a non-existent row. For cases where the Offset function references values in an existing row, the ReplaceNull function is compiled using the expression for the non-null case.

TABLE 6

Normalization Transformations for Running and Moving Sequence Functions

RunningSum(a) →
    Offset(RunningSum(a),1) + ReplaceNull(a, a, 0)
MovingSum(a, window) →
    Aux1 = Offset(Aux1, 1) + ReplaceNull(a, a, 0)
    Aux2 = Offset(Aux1, window)
    MovingSum(a, window) = Aux1−Aux2
RunningAverage(a)
    Aux1 = Offset(Aux1, 1) + ReplaceNull(a, a, 0)
    Aux2 = Offset(Aux2, 1) + ReplaceNull(a, 1, 0)
    RunningAverage(a) = Aux1/Aux2
MovingAverage(a) →
    Aux1 = Offset(Aux1, 1) + ReplaceNull(a, a, 0)
    Aux2 = Offset(Aux1, window)
    Aux3 = Offset(Aux3, 1) + ReplaceNull(a, 1, 0)
    Aux3 = Offset(Aux3, window)
    MovingAverage(a) = (Aux1−Aux2)/(Aux3−Aux4)
RunningVariance(a) →
    Aux1 = Offset(Aux1, 1) + ReplaceNull(a, a × a, 0)
    Aux2 = Offset(Aux2, 1) + ReplaceNull(a, a, 0)
    Aux3 = Offset(Aux3, 1) + ReplaceNull(a, 1, 0)
    RunningVariance(a) = (Aux1−Aux2 × Aux2/Aux3)/Aux3 - 1)
MovingVariance(a) →
    Aux1 = Offset(Aux1, 1) + ReplaceNull(a, a × a, 0)
    Aux2 = Aux1 - Offset(Aux1, window)
    Aux3 = Offset(Aux2, 1) + ReplaceNull(a, a, 0)
    Aux4 = Aux3 - Offset(Aux3, window)
    Aux5 = Offset(Aux3, 1) + ReplaceNull(a, 1, 0)

TABLE 6-continued

Normalization Transformations for Running and Moving Sequence Functions

Aux6 = Offset(Aux5, window)
    MovingVariance(a) = (Aux1−Aux4 × Aux4/Aux6)/(Aux6 - 1)

The transformations shown in Table 6 have the qualities that they:
1) result in a set of scalar expressions, each involving only a single Offset function and other non-sequence function expressions; and
2) eliminate the previously described dependence on accessing every row in the moving window.

Rows Since Sequence Function

Another aspect of the present invention is the Rows Since sequence function. The purpose of the Rows Since function is to determine the distance, in rows, between the current row and the most recent row in which a search condition was true. In this sense, Rows Since is a sort of inverse operation to the Offset function, returning the effective offset of the nearest previous row that satisfies a specified search condition.

In order to allow the search condition to contain values from the current row to be compared to the values in historical rows, a function called "THIS" is provided. The THIS function is used within a Rows Since function, essentially as a sub-function of the Rows Since function. All expressions included in a THIS function are evaluated with respect to the current row. All expressions not included in a THIS function are implicitly drawn from each row in the set of historical rows. For example, the following query returns the number of consecutive days (rows) for which the current day's low temperature is the lowest temperature.
    SELECT ROWS SINCE (THIS (LOWTEMP) >LOWTEMP)
    FROM TEMP
    SEQUENCE BY DAY;

A slightly more complex query could return the number of consecutive days for which a temporarily high or low temperature was recorded.
    SELECT ROWS SINCE (THIS (LOWTEMP) >LOWTEMP OR
    THIS (HIGHTEMP)<HIGHTEMP)
    FROM TEMP
    SEQUENCE BY DAY;

Simple Rows Since Model

As discussed above, any expression containing sequence functions other than THIS can be evaluated for each historical row, and then remain static for the life of the query. However, since the THIS function always refers to the current row, it would appear that every historical row would require re-evaluation of its Rows Since search condition, substituting the current values of any expressions enclosed in a THIS function. In other words, the presence of values from the current row in the search condition appears to require re-evaluation of the entire search condition for every historical row. If true, this would make implementation of the Rows Since function very expensive.

It is, however, not the entire search condition that must be re-evaluated for each new row, but only the values that are new in that row, namely those inside the THIS function(s).

One aspect of the present invention provides a method for normalizing the Rows Since function during SQL compilation. In particular, the normalization procedure:

isolates the portions of the Rows Since search condition that may be computed once for each historical row, namely those which are not contained inside the THIS function;

materializes (i.e., stores in the history buffer as auxiliary columns) only those portions of the historical rows; and iterates over the historical rows, starting with the most recent, and returns the Offset of the first row for which the condition evaluates to true.

This can be accomplished by preserving the central feature of the efficient implementation of the Offset function, which is to materialize (i.e., store in the history buffer) required values in historical rows in order to evaluate subsequent rows.

Since the THIS expression exists only for the present row (to which the cursor is currently pointing), it should not appear inside the Offset expression.

As will be described in more detail below, the normalization process allows the Rows Since function to be computed in a minimal number of operations per invocation. The number of operations increases with both the number and complexity of the THIS functions present in the search condition. In other words, a single THIS function with a number of computations in it has the same effect as several THIS functions each having a single computation. The resulting expressions consist only of the primitive sequence function, Offset, and other standard scalar expressions.

The Rows Since sequence function (specifically when it contains a THIS sequence function) involves a comparison between the current row's values and selected values in each history row. The values that must be materialized in the history rows are precisely those that are not contained inside a THIS function. This implies a need for a NotTHIS function, which is the inverse of THIS. Conversion from the THIS form to the NotTHIS form requires performing a transformation from THIS to NotTHIS inside the Rows Since predicate (i.e., the search condition), thus allowing the NotTHIS portions to be computed using the Offset sequence function.

The overall steps of the transformation process are shown in Table 7.

TABLE 7

Normalization (Transformation) Process for Rows Since Sequence Function

1. Perform the THIS to NotTHIS transformation:
   Parse the Rows Since predicate to form a predicate tree.
   Apply the following steps to each child of the Rows Since predicate tree, starting at the root node:
   A. If the child node is a THIS function, continue to the next child;
   B. If the child contains a THIS function, recurse downward (in order to detect a lower This/NotThis split);
   C. Else (this child contains no children that are THIS functions):
      Insert a NotTHIS function as the parent of this child and return;
2. Traverse the predicate, transforming NotTHIS(a) to Offset(a, INDEX);
3. Traverse the predicate, transforming THIS(a) to (a);
4. Transform Rows Since (predicate) to an expression which:

returns NULL if the index of the Offset function is out of range;
else, if "predicate" is true, returns the value of INDEX;
else, increments INDEX.

The above transformation process converts the predicate THIS (LOWTEMP)>LOWTEMP OR THIS (HIGHTEMP)<HIGHTEMP) into:

(LOWTEMP>OFFSET (LOWTEMP, INDEX) OR HIGHTEMP<OFFSET (HIGHTEMP, INDEX)

The Rows Since function is then converted into the following:

Instructions for storing information for the current row in one or more auxiliary fields in the history buffer. The information stored in the auxiliary field is information being materialized for access by the Offset function(s) in the converted predicate while processing later rows of the table.

Loop: For Index=1 to BufferSize, Increment by 1
   Evaluate Predicate (which has one or more Offset functions)
   Exit loop if Predicate is True
End of Loop {return NULL if loop ends without Predicate evaluating to True,
   Else return the value of Index}

Using a second version of the Rows Since function, herein called Rows Since0, the search loop starts with an index value of zero instead of one:

Loop: For Index=0 to BufferSize, Increment by 1 so as to include the current row in the search for row for which the predicate evaluates to True.

After step 1 of the transformation process shown in Table 7, the NotTHIS expressions indicate what values need to be materialized (i.e., stored in auxiliary columns in the history buffer), and the resulting Rows Since expression is compiled, using the compilation techniques described above for the Offset function. After the last step of the transformation, the values to be stored in the history buffer are the expressions of the Offset functions. With this transformation, the Rows Since sequence function can be evaluated efficiently since the pre-computed expressions (those within the NotTHIS functions, which become those within the expression portion of the Offset functions) have been maximized and the amount of computation to be done on each iteration has been minimized.

Effectively, the Rows Since expression is converted into an execution loop with one or more Offset functions being evaluated for increasing Index values with each execution of the loop. The loop terminates when the expression evaluated in the loop is evaluated to a value of True, or when the expression does not evaluate to True for any row for which data is stored in the history buffer. It is noted that the converted Rows Since function uses a loop variable (i.e., the Index variable) that is not directly available to the user, but which is used to generate the return value for the Rows Since function.

Alternate Embodiments

The present invention can be implemented as a computer program product that includes a computer program mechanism embedded in a computer readable storage medium. For instance, the computer program product could contain the program modules shown in FIG. 1. These program modules may be stored on a CD-ROM, magnetic disk storage product, or any other computer readable data or program storage product. The software modules in the computer program product may also be distributed electronically, via the Internet or otherwise, by transmission of a computer data signal (in which the software modules are embedded) on a carrier wave.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A computer program product for use in conjunction with a computer system, the computer program product comprising a computer readable storage medium and a computer program mechanism embedded therein, the computer program mechanism comprising:

a query compiler for compiling a database query, the query compiler including:

an Offset sequence function compiler, for compiling an Offset sequence function Offset(argument, index) in the database query, wherein the argument of the Offset sequence function is a specified function of information associated with a row of a table, the row having a position that is index rows before a current row referenced by a cursor for the table; the Offset function compiler including:

instructions for parsing the argument of the Offset sequence function to determine a set of auxiliary fields to be stored for each row of a table to be accessed, each auxiliary field of each row containing information that may be accessed during execution of the Offset sequence function while the cursor for that table is pointing to a subsequent row; and instructions for converting the Offset sequence function into a compiled set of instructions, including instructions for storing and reading the auxiliary fields to and from a buffer that is separate from the table.

2. The computer program product of claim 1, wherein the compiled set of instructions leave the cursor for the table positioned at the current row while evaluating the Offset sequence; and the compiled set of instructions access information from the row at index rows before the current row only from the auxiliary fields in the buffer.

3. The computer program product of claim 1, wherein the parsing instructions determine a minimum set of the auxiliary fields to be stored for each row of the table.

4. A method of executing a database query, comprising:

determining whether the query includes an Offset sequence function Offset(argument, index), wherein the argument of the Offset sequence function is a specified function of information associated with a row of a table, the row having a position that is index rows before a current row referenced by a cursor for the table, and when that determination is positive, performing steps of:

while accessing rows of a table, storing for each accessed row of the table one or more auxiliary fields in a buffer that is separate from the table, each of the auxiliary fields containing information that may be accessed during execution of the Offset sequence function while a cursor for the table is pointing to a subsequent row; and while evaluating the Offset sequence function for a current row of the table, reading information for a previously accessed row of the table by reading one or more of the auxiliary fields stored for the previously accessed row in the separate buffer.

5. The method of claim 4, including leaving the cursor for the table positioned at the current row while evaluating the Offset sequence; and the evaluating and reading information steps including accessing information from the row at index rows before the current row only from the auxiliary fields in the buffer.

6. The method of claim 4, including determining a minimum set of the auxiliary fields to be stored for each row of the table.

7. A method of compiling a database query, comprising:

determining whether the query includes an Offset sequence function Offset(argument, index), wherein the argument of the Offset sequence function is a specified function of information associated with a row of a table, the row having a position that is index rows before a current row referenced by a cursor for the table, and when that determination is positive, performing steps of:

compiling the Offset sequence function in the database query, including:

parsing the argument of the Offset sequence function to determine a set of auxiliary fields to be stored for each row of a table to be accessed, each auxiliary field of each row containing information that may be accessed during execution of the Offset sequence function while the cursor for that table is pointing to a subsequent row; and converting the Offset sequence function into a compiled set of instructions, including instructions for storing and reading the auxiliary fields to and from a buffer that is separate from the table.

8. The method of claim 7, wherein the compiled set of instructions leave the cursor for the table positioned at the current row while evaluating the Offset sequence; and the compiled set of instructions access information from the row at index rows before the current row only from the auxiliary fields in the buffer.

* * * * *